United States Patent
Akhlaq et al.

(10) Patent No.: US 9,148,849 B2
(45) Date of Patent: Sep. 29, 2015

(54) COVERAGE, CONNECTIVITY AND COMMUNICATION (C3) PROTOCOL METHOD FOR WIRELESS SENSOR NETWORKS

(71) Applicants: KING FAHD UNIVERSITY OF PETROLEUM AND MINERALS, Dhahran (SA); KING ABDULAZIZ CITY FOR SCIENCE AND TECHNOLOGY, Riyadh (SA)

(72) Inventors: Muhammad Akhlaq, Hafr Al-Batin (SA); Tarek R. Sheltami, Dhahran (SA)

(73) Assignees: KING FAHD UNIVERSITY OF PETROLEUM AND MINERALS, Dhahran (SA); KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 193 days.

(21) Appl. No.: 13/909,023

(22) Filed: Jun. 3, 2013

(65) Prior Publication Data

US 2014/0355499 A1   Dec. 4, 2014

(51) Int. Cl.
*H04W 52/02* (2009.01)
*H04W 4/00* (2009.01)

(52) U.S. Cl.
CPC .......... *H04W 52/0203* (2013.01); *H04W 4/006* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 4,685,149 A | 8/1987 | Smith et al. | |
| 6,754,250 B2 | 6/2004 | Haartsen | |
| 6,980,537 B1* | 12/2005 | Liu | 370/338 |
| 7,006,451 B2 | 2/2006 | Kuwahara | |
| 7,280,555 B2 | 10/2007 | Stanforth et al. | |
| 7,486,633 B2 | 2/2009 | Tamura | |
| 8,019,576 B2 | 9/2011 | Luss | |
| 2006/0281470 A1* | 12/2006 | Shi et al. | 455/456.2 |
| 2007/0005292 A1* | 1/2007 | Jin | 702/150 |
| 2007/0076650 A1* | 4/2007 | Manjeshwar et al. | 370/328 |

(Continued)

OTHER PUBLICATIONS

Xiaorui Wang, Guoliang Xing, Yuanfang Zhang, Chenyang Lu, Robert Pless and Christopher Gill, "Integrated Coverage and Connectivity Configuration in Wireless Sensor Networks", Proceedings of the First ACM Conference on Embedded Networked Sensor Systems (SenSys'03), pp. 28-39 (2003).

*Primary Examiner* — Jeffrey M Rutkowski
*Assistant Examiner* — Jonathan B Wood
(74) *Attorney, Agent, or Firm* — Richard C. Litman (57) ABSTRACT

The coverage, connectivity and communication (C3) protocol method for wireless sensor networks is an integrated and energy-efficient protocol for Coverage, Connectivity and Communication (C3) in WSNs. The C3 protocol uses RSSI to divide the network into virtual rings, defines clusters with clusterheads more probably at alternating rings, defines dings, which are rings inside a cluster, uses triangular tessellation to identify redundant nodes, and communicates data to sink through clusterheads and gateways. The protocol strives for near-optimal deployment, load balancing, and energy-efficient communication. Simulation results show that the C3 protocol ensures partial coverage of more than 90% of the total deployment area, ensures 1-connected network, and facilitates energy-efficient communication, while expending only ¼th of the energy compared to other related protocols.

8 Claims, 8 Drawing Sheets

(56) References Cited

U.S. PATENT DOCUMENTS

| | | |
|---|---|---|
| 2008/0062865 A1* | 3/2008 | Neugebauer .................. 370/229 |
| 2008/0151761 A1* | 6/2008 | Theisen et al. ................ 370/241 |
| 2008/0253327 A1* | 10/2008 | Kohvakka et al. ............ 370/330 |
| 2009/0059827 A1 | 3/2009 | Liu et al. |
| 2009/0207748 A1* | 8/2009 | Choi et al. .................... 370/252 |
| 2009/0322518 A1* | 12/2009 | Liang et al. ............... 340/539.18 |
| 2010/0110930 A1* | 5/2010 | Kohvakka et al. ............ 370/254 |
| 2010/0238862 A1* | 9/2010 | Davidson et al. ............. 370/328 |
| 2011/0211513 A1* | 9/2011 | Coleri Eregen et al. ...... 370/311 |
| 2011/0310770 A1 | 12/2011 | Liang et al. |
| 2012/0036198 A1* | 2/2012 | Marzencki et al. ........... 709/206 |
| 2012/0077513 A1* | 3/2012 | Rizzello et al. ............. 455/456.1 |
| 2013/0201316 A1* | 8/2013 | Binder et al. ................... 348/77 |

\* cited by examiner

WSN divided into rings

*Fig. 6*

WSN further divided into clusters

COVERAGE, CONNECTIVITY AND COMMUNICATION (C3) PROTOCOL METHOD FOR WIRELESS SENSOR NETWORKS

BACKGROUND OF THE INVENTION

1. Field of the Invention

The present invention relates to wireless sensor network (WSN) protocols, and particularly to a coverage, connectivity and communication (C3) protocol method for wireless sensor networks.

2. Description of the Related Art

In ubiquitous and pervasive systems, the lower layer consists of wireless ad hoc and sensor networks. However, the use of wireless sensor networks (WSNs) is becoming more popular. Efficient use of energy is a key issue in WSNs due to very limited battery power. A sensor node that exhausts its battery dies and disconnects from the network, reducing the lifetime of a network. Most of the sensors' energy is consumed in data transmission, and idle listening. Therefore, efficient use of energy can be ensured by improved topology control, duty-cycling, communication protocols, and aggregation and compression of data.

Nodes in WSNs may be in either sleep mode or active mode. A node must be in active mode before it can receive or transmit a message. It is important to note that the sleep mode usually consumes three orders of magnitude less energy, while energy costs for receive and transmit are of the same magnitude. The energy costs for idle listening, receiving, and overhearing are almost similar (within 20-30%). For example, the CC2420 chip consumes only 60 μW in sleep mode, 59 mW while receiving, and 52 mW while transmitting. Therefore, it is best to keep the sensor radio in sleep mode when inactive. In other words, we can conserve energy by minimizing the number of transmissions and by putting the sensor nodes to sleep mode if they are redundant or have no data to send or receive. Therefore, the issues of coverage, connectivity and communication are of primary concern in WSNs. As WSNs are usually overdeployed, it is useful to keep redundant nodes in sleep mode until some neighboring node fails or exhausts its energy. However, identification of the redundant nodes should be done very carefully so that coverage and connectivity of the network is preserved.

While coverage is the ratio of area-sensing covered by the sensors to the total deployment area of the network, connectivity is the availability of a path between each node of the network. Some applications need partial coverage, whereas others need k-coverage. Similarly, some applications need simple connectivity, while others need k-connected network for fault tolerance, infrastructure creation, and maintenance, which consumes a lot of energy in WSNs. Therefore, energy-efficient algorithms are needed for coverage, connectivity and communication in WSNs.

Thus, a coverage, connectivity and communication (C3) protocol method for wireless sensor networks solving the aforementioned problems is desired.

SUMMARY OF THE INVENTION

The coverage, connectivity and communication (C3) protocol method for wireless sensor networks is an integrated and energy-efficient protocol for Coverage, Connectivity and Communication (C3) in WSNs. The C3 protocol uses RSSI (received signal strength indication) to divide the network into virtual rings, defines clusters with clusterheads more probably at alternating rings, defines dings, which are rings inside a cluster, uses triangular tessellation to identify redundant nodes, and communicates data to sink through clusterheads and gateways. The present protocol method strives for near-optimal deployment, load balancing, and energy-efficient communication.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

At the outset, it should be understood by one of ordinary skill in the art that embodiments of the present method can comprise software or firmware code executing on a computer, a microcontroller, a microprocessor, or a DSP processor; state machines implemented in application specific or programmable logic; or numerous other forms without departing from the spirit and scope of the method described herein. The present method can be provided as a computer program, which includes a non-transitory machine-readable medium having stored thereon instructions that can be used to program a computer (or other electronic devices) to perform a process according to the method. The machine-readable medium can include, but is not limited to, floppy diskettes, optical disks, CD-ROMs, and magneto-optical disks, ROMs, RAMs, EPROMs, EEPROMs, magnetic or optical cards, flash memory, or other type of media or machine-readable medium suitable for storing electronic instructions.

Figure 1:
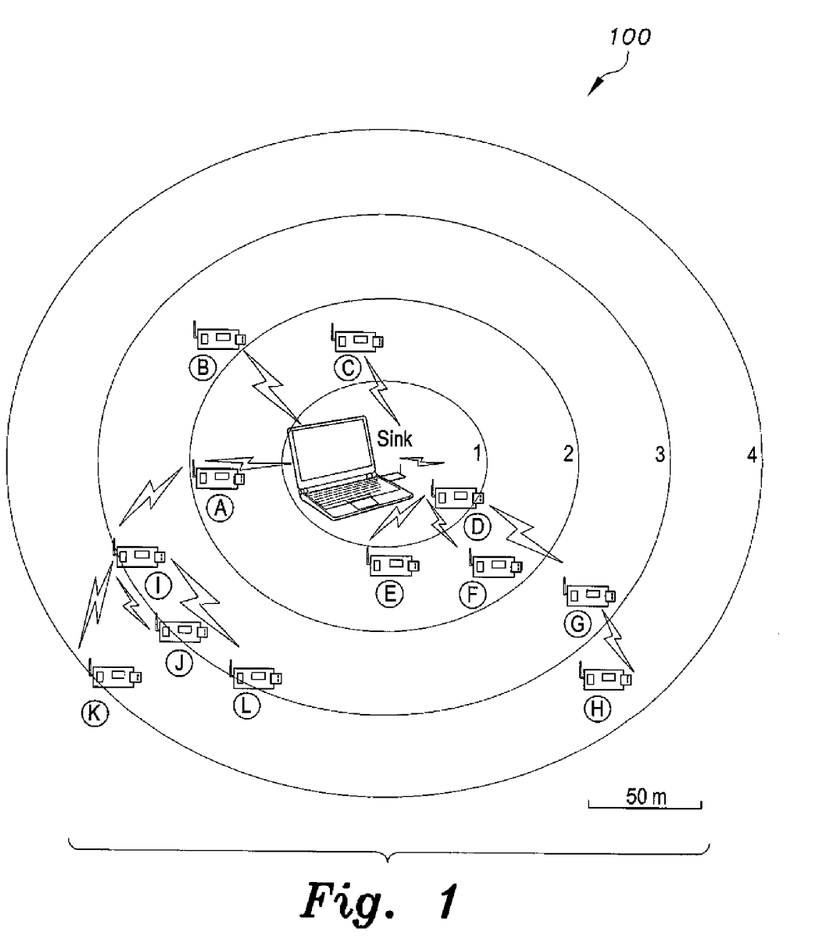
FIG. 1 is a diagram of a network infrastructure created by the coverage, connectivity and communication (C3) protocol method for wireless sensor networks according to the present invention.
Figure 2:
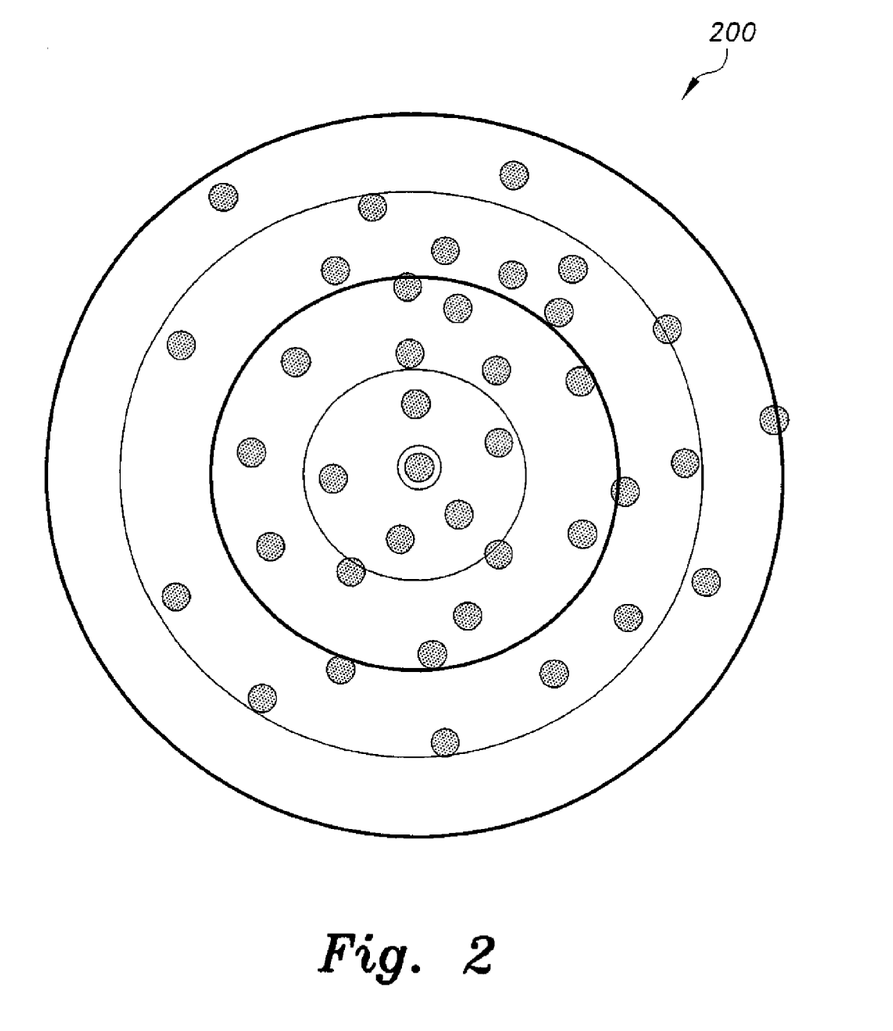
FIG. 2 is a diagram showing a WSN as a set of rings with a sink at the center.

The coverage, connectivity and communication (C3) protocol method 10 (process flow shown in FIGS. 3A, 3B, and 3C) for wireless sensor networks forms virtual rings in the network, and uses a triangular tessellation based deployment based on RSSI-based distance estimation. As shown in FIG. 1, a WSN 100 may be deployed in virtual rings of a required width and having a sink at the center of the rings. The optimal width of the rings is determined by $R_C$, where $R_C$ is the communication range of nodes. Two rings are made at one hop. FIG. 2 is a diagram 200 that shows a generalized example of the virtual ring topology.

The rings of optimal width can help in establishing network connectivity. For example, multi-parent staggered wakeup scheduling MAC (MS-MAC) for WSNs organizes the sensor nodes as a set of rings having an optimal width of $\mu = R_c/2.45$. For a specific node in ring M, the number of potential forwarders in the upper ring M-1, i.e., closer to the base station, is determined by the network density $\rho$ (nodes/m$^2$). It assumes that the nodes are location aware and are randomly deployed, and the base station is located at ring 0. However, such a scheme results in a route-length that is more than twice the shortest path, which significantly increases the end-to-end delay.

In C3 protocol, the above idea of ring formation is extended. However, C3 does not assume nodes to be location aware. Instead, C3 uses the Received Signal Strength Indicator (RSSI) for distance estimation in order to define rings in the network. Moreover, the network is divided into clusters, where the probability of a node to be selected as clusterhead is higher in odd-numbered rings during one round, but higher in even-numbered rings during the other round. Odd or even numbered rings preferably form clusterheads in a specific round, while neighboring nodes in the lower ring join the cluster, which makes route-length almost equal to the shortest path.

Figure 8:
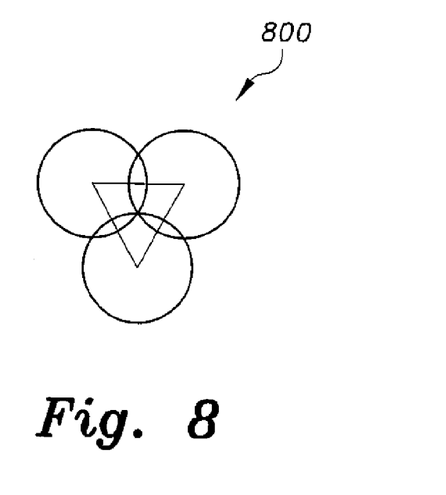
FIG. 8 is a diagram illustrating triangular tessellation for coverage in a coverage, connectivity and communication (C3) protocol method for wireless sensor networks according to the present invention.

A static network can be planned in advance and deployed optimally using schemes, such as square, hexagon, etc. The triangular tessellation 800, as shown in FIG. 8, is, however, considered as the most optimal deployment of sensors in WSNs. The idea of optimal deployment has been exploited even after the deployment in sleep scheduling schemes, for example, where nodes at optimal positions are kept active, while others are allowed to sleep. For instance, the known Layered Diffusion-based Coverage Control (LDCC) uses the idea of triangular tessellation. In order to provide total connectivity-coverage, the distance between two nodes should be $\{\sqrt{3}R_s, R_c\}$, where $R_c$ is the communication range and $R_s$ is the sensing range of nodes.

The Received Signal Strength Indicator (RSSI) measures the power of a received signal. The 802.11 standard commonly implements it. The value of RSSI can be used to estimate the distance between two nodes where distance is indirectly proportional to RSSI. As the RSSI value may be increased due to the presence of noise, Link Quality Indicator (LQI) is also provided by some standards. However, RSSI and LQI are perfectly correlated, which means that either of the two can be used for distance estimation. RSSI is used for distance estimation in the present C3 protocol method. This is because RSSI is a better indicator of distance especially when distance should be estimated by using only one measurement, instead of several measurements that can be averaged out. Table 1 lists valid assumptions regarding C3 protocol algorithm environment.

TABLE 1

Assumptions for C3 Algorithms

| | |
|---|---|
| 1 | Nodes have unique IDs from 0 to n−1. |
| 2 | The network-deployment is random, dense and almost uniform. |
| 3 | Controlled flooding of messages is possible. |
| 4 | RSSI values are available for the received signals. |
| 5 | Communication range $R_C$ can be adjusted when needed. |

Figure 4:
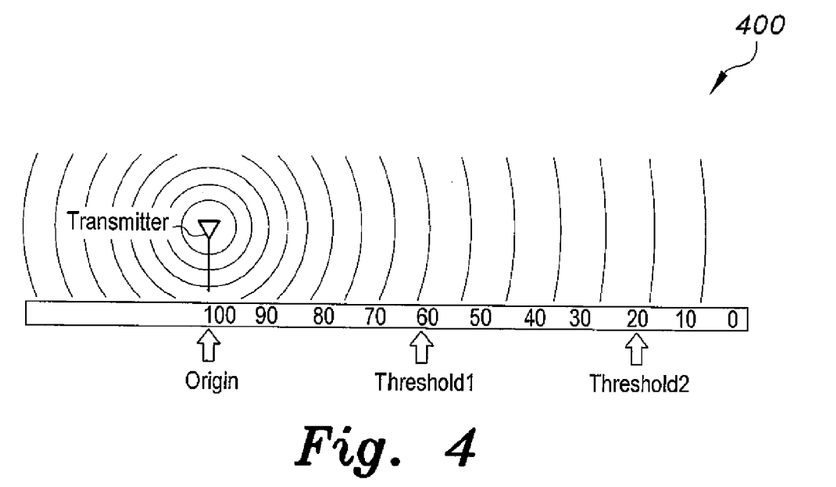
FIG. 4 is a distance estimation diagram showing the RSSI technique in a coverage, connectivity and communication (C3) protocol method for wireless sensor networks according to the present invention.

RSSI is used to estimate distance of the receiver from a sender. The value of RSSI near the sender is the highest as shown in FIG. 4 400. Nodes that receive a signal stronger than Threshold1 (Th1) make the first ring, while nodes that receive a weaker signal that is stronger than Threshold2 (Th2) make the second ring. Here, Th1 is the RSSI value at a distance from the transmitter, which is equal to 40% of the communication range $R_C$, while Th2 is equal to 80% of $R_C$.

The present C3 method 10 achieves its objectives by exchanging messages in the format that is shown in Table 2. Moreover, nodes maintain a few variables, including myID, myCH, myHopNo, myRingNo, myDingNo, myEnergy, myUpCH, myDownCH, myPeerLeftCH, myPeerRightCH, etc.

TABLE 2

Structure of a C3 Message

| Field | Description |
|---|---|
| msgType | initHopRing, initCovRing, joinMe, iJoinYou |
| msgID | ID of the message |
| senderID | ID of the message sender |
| destID | ID of the destination node |
| txPower | Transmission power for the message |
| roundNo | Current round number |
| hopNo | Hop number of the sender |
| ringNo | Ring number of the sender |
| dingNo | Ring number of the sender node inside a cluster |
| myStatus | Fully Active; Sensing Only; Sleeping |

Node states are enumerated in Table 3.

TABLE 3

Node States

| | |
|---|---|
| 1 | FULLY ACTIVE: A fully active node can sense its environment and can transmit and receive messages. Nodes in this state consume higher energy. |
| 2 | SENSING ONLY: A sensing only node can sense its environment but cannot transmit or receive messages. A very low energy is consumed in this state. |
| 3 | SLEEPING: A sleeping node can neither sense its environment nor can it transmit and receive messages. Extremely low energy is consumed in this state. |

The Coverage, Connectivity and Communication (C3) protocol method 10 runs in six major steps as enumerated in Table 4.

TABLE 4

The C3 Protocol

| | |
|---|---|
| 1 | Formation of rings: It divides the network deployment area into virtual rings of optimal width μ. |
| 2 | Formation of clusters: It makes clusters such that the nodes at alternating rings have higher probability of being selected as clusterheads. |

TABLE 4-continued

The C3 Protocol

3  Formation of dings: A ding is nothing but a ring inside a cluster. It makes dings by setting communication range RC to √3RS.
4  Identification of redundant nodes: It uses triangular tessellation inside a cluster to identify redundant nodes. The redundant nodes are scheduled to sleep for a time period T.
5  Establish connectivity: It establishes communication links between neighboring nodes and gateways.
6  Routing or communication: Finally, it allows nodes to send and receive data through clusterheads which may involve gateways.

Figure 3A:
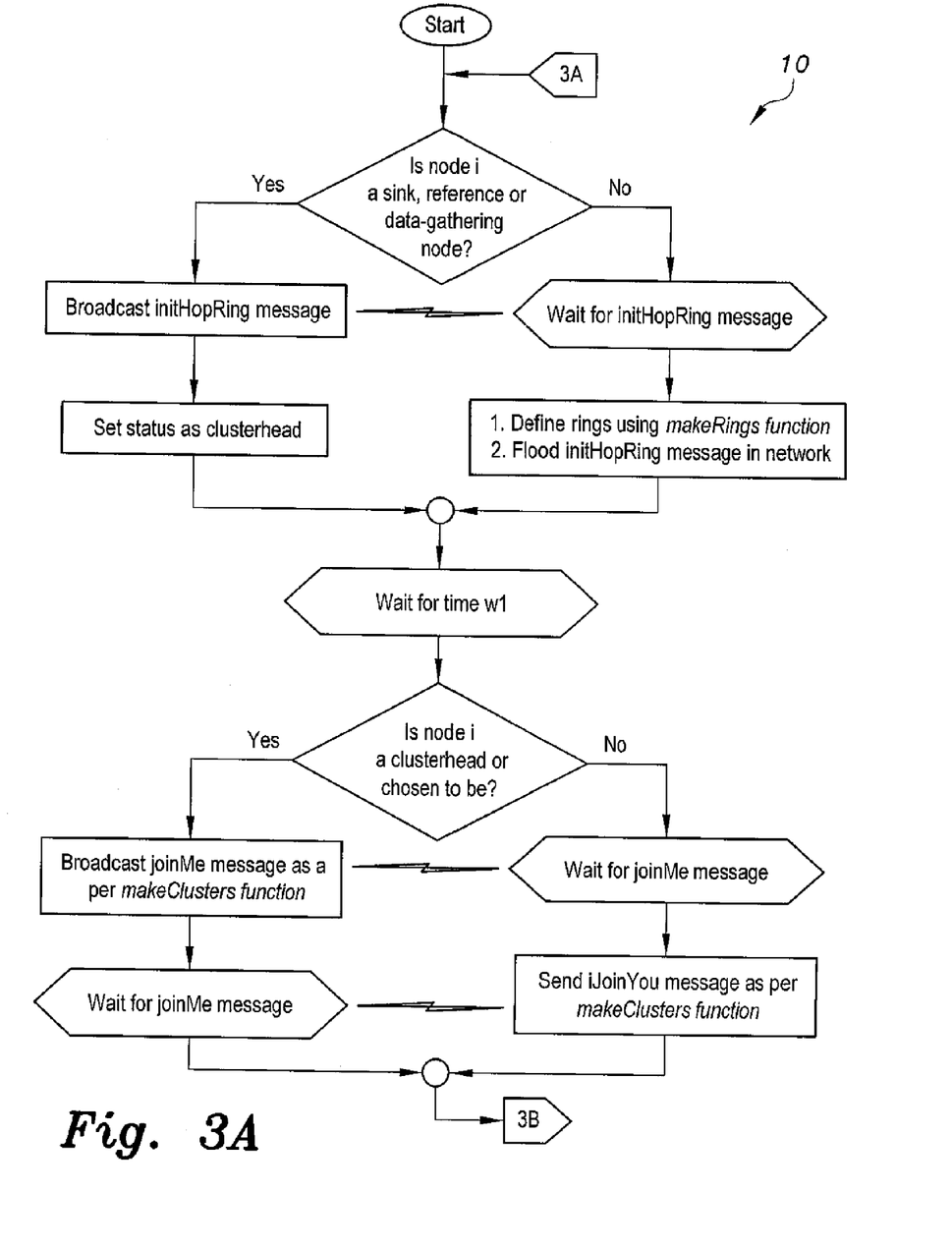
FIGS. 3A, 3B and 3C are a flowchart illustrating the coverage, connectivity and communication (C3) protocol method for wireless sensor networks according to the present invention.
Figure 3B:
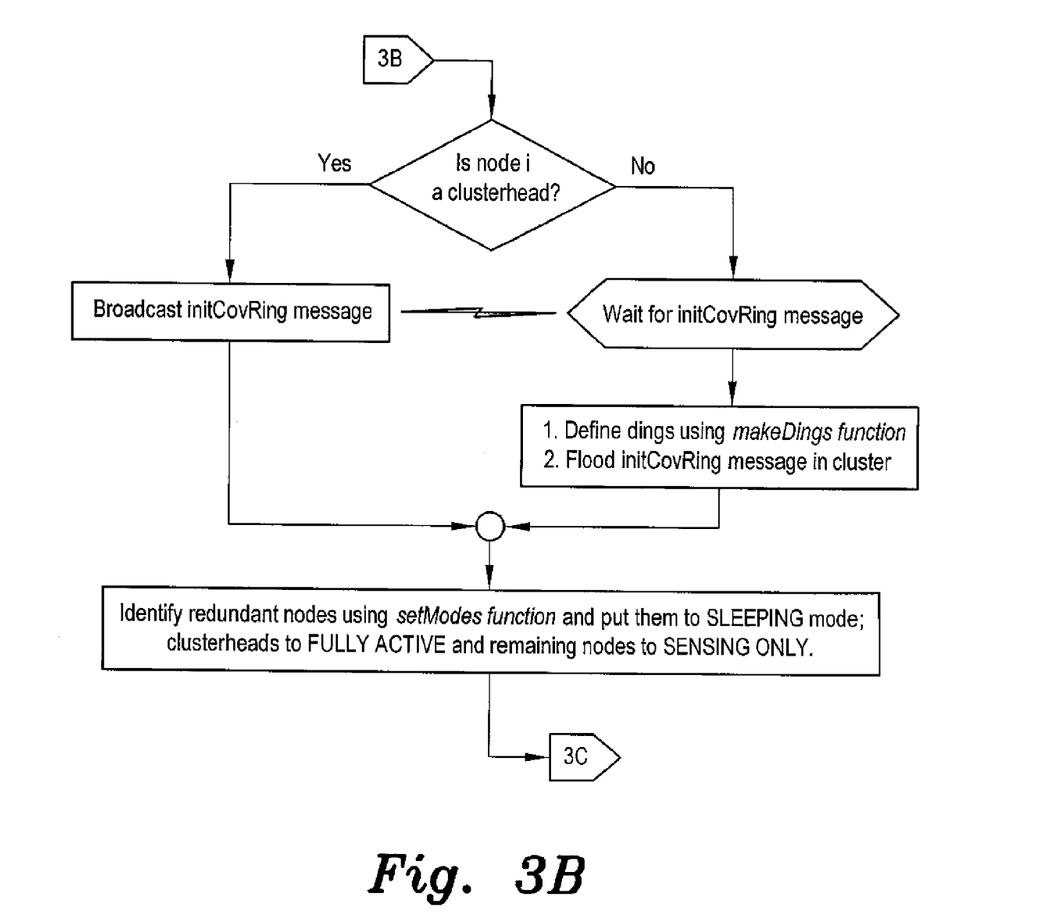
Figure 3C:
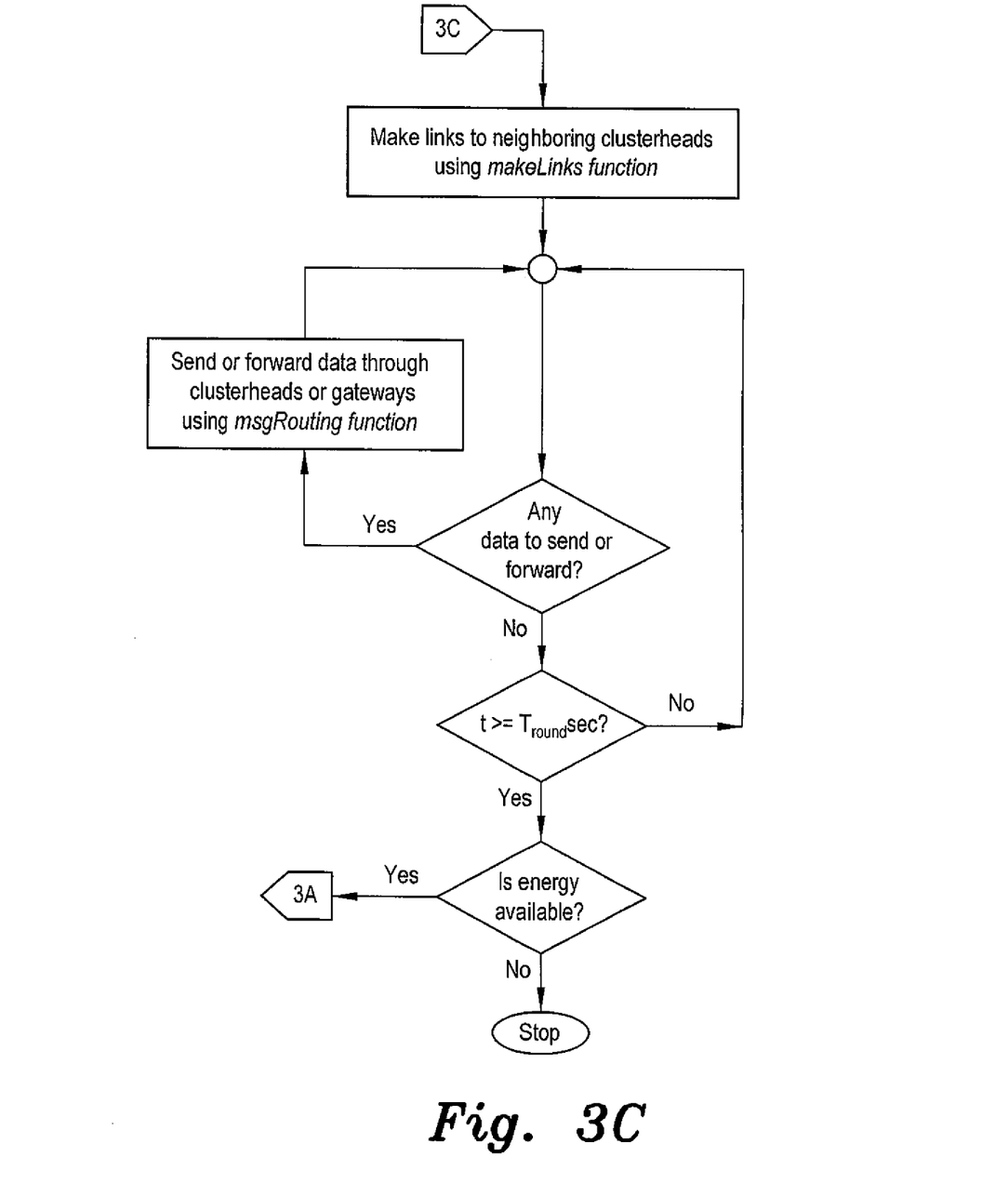

After the network starts, the sink, reference node or a data gathering node broadcasts initHopRing message with roundNo=0. Algorithm 1, main describes the main function which calls a few other functions. The flowchart of the C3 protocol method 10 is shown in FIGS. 3A-3C.

TABLE 5

C3 Main Algorithm

```
   /* After the network starts, the sink or reference node or data
   gathering node broadcasts initHopRing message with roundNo=0*/
1  Start up the node to join the network;
2  Set roundNo= -1;
3  Do
4     If node i is a sink, reference or data-gathering node then
5        Broadcast initHopRing message with roundNo= roundNo +1,
         hopNo=0, ringNo=0;
6        Set status as clusterhead;
7     Else
8        Call makeRings;
9        Call makeClusters;
10       Call makeDings;
11       Call setModes;
12       Call makeLinks;
13       Call msgRouting;
14    End if
15 While (myEnergy > 0);
```

The C3 protocol method 10 divides the network deployment area into virtual rings of optimal width μ, which is 40% of the communication range $R_c$. Usually, two rings are made in a hop, while three rings are possible in the farthest hop only.

A node that receives an initHopRing message can find its hop number and ring number based on RSSI as follows. Here, Th1 is the RSSI value at a distance from the transmitter that is equal to 40% of the communication range $R_c$, and Th2 at 80%.

TABLE 6

C3 Algorithm 2 - makeRings

```
   /* A node that receives an initHopRing message finds its hop no. and
   ring no. based on RSSI as follows: */
1  Wait for initHopRing message;
2  If myHopNo > msg→hopNo then
3     If RSSI > Th1 then
4        myRingNo=2*(msg→hopNo)+1;
5     Else if RSSI > Th2 then
6        myRingNo=2*(msg→hopNo)+2;
7     Else
8        myRingNo=2*(msg→hopNo)+3;
9     End if
10    myHopNo = msg→hopNo + 1;
11    Broadcast initHopRing with msg→hopNo=myHopNo,
      msg→ringNo=myRingNo;
12 End if
```

The C3 protocol method 10 makes clusters such that the nodes at alternating rings have higher probability of being selected as clusterheads. A node waits for the time w1 before it can become candidate for clusterhead as follows:

$$w1 = myID + (1/myEnergy) + ((roundNo + ringNo)\%2) \quad (1)$$

After waiting for time w1, a node announces to become clusterhead by broadcasting a joinMe message. A receiving node that is at the same or a neighboring ring may join it according to the makeClusters algorithm 3, shown in Table 7.

TABLE 7

C3 Algorithm 3 - makeClusters

```
   /* After waiting for time w1, a node announces to become
   clusterhead by broadcasting a joinMe message. A receiving node that
   is at same or neighboring ring may join it as follows: */
1  w1=myID+(1/myEnergy)+((roundNo+ringNo)%2);
2  Wait (w1);
3  If joinMe message NOT received then
4     myCH = myID;
5     Broadcast joinMe message;
6     Set myStatus = FULLY ACTIVE;
7  Else if node i is free then
8     If (RSSI>Th2 AND myRingNo==msg→ringNo+1) OR (RSSI>
      Th1) then
9        // closer and lower nodes join now
10       myCH = msg→senderID;
11       Send iJoinYou message as acknowledgement;
12    Else
13       Wait (RSSI);
14       If a joinMe message with stronger RSSI is received then
15          Pick the strongest joinMe message received;
16          myCH = msg→senderID;
17          Send acknowledgement by sending iJoinYou message;
18       Else
19          myCH = myID;
20          Broadcast joinMe message;
21          Set myStatus = FULLY ACTIVE;
22       End if
23    End if
24 End if
```

With respect to the formation of dings, the C3 protocol method 10 ensures partial coverage by applying triangular tessellation inside a cluster. A ding is defined as a ring inside a cluster. The value of dingNo is updated as follows, which also guarantees total connectivity-coverage:

$$dingNo = 1 + (R_c \% \sqrt{3} R_s) \quad (2)$$

Within each cluster, a clusterhead starts the process of forming dings by broadcasting initCovRing message with msg→dingNo=0 and myStatus=FULLY ACTIVE within a cluster. All the nodes are active and listening in the beginning. The receiving nodes in a cluster define their dingNo as shown in Table 8:

TABLE 8

C3 Algorithm 4 - makeDings

```
   /* Within each cluster, a clusterhead starts the process of forming
   dings by broadcasting initCovRing message with msg→dingNo=0
   and myStatus = FULLY ACTIVE within a cluster. All the nodes are
   active and listening in the beginning. The receiving nodes in a cluster
   define their dingNo as follows: */
1  If node i is a clusterhead then
2     Broadcasting initCovRing message with msg→dingNo=0
3        and myStatus = FULLY ACTIVE within a cluster;
4  Else
5     Wait for initCovRing message from the clusterhead;
6     If R_C ≤ √3R_S then
7        Return;
8     Else
9        dingNo = 1+(R_C%√3R_S);
10       w2 = (1/myEnergy) + (dingNo + myID) ; // to avoid collision
11       Wait (w2);
```

TABLE 8-continued

C3 Algorithm 4 - makeDings

| | |
|---|---|
| 12 | Set $R_C=\sqrt{3}R_S$ ; |
| 13 | Broadcasting initCovRing message within a cluster with |
| 14 | msg→dingNo= dingNo and myStatus = SENSING ONLY; |
| 15 | Reset $R_C$ to original value ; |
| 16 | End if |
| 17 | End if |

Regarding sleep scheduling, the C3 protocol finds the nodes that are eligible to sleep. A node can sleep if it has two or more SENSING ONLY or FULLY ACTIVE nodes in the same ding or the next ding that is away from clusterhead.

The nodes that receive initCovRing message from their clusterheads set their modes according to the setModes algorithm 5 detailed in Table 9.

TABLE 9

C3 Algorithm 5 - setModes

| | |
|---|---|
|   | /* The nodes that receive initCovRing message from their clusterheads set their modes as follows: */ |
| 1 | Check the value of myStatus field in initCovRing messages received; |
| 2 | If two or more messages are received from neighbors having same dingNo or dingNo+1 with myStatus as SENSING ONLY or FULLY ACTIVE then |
| 3 | Set mode to SLEEPING for time period T; |
| 4 | Else |
| 5 | Set mode to SENSING ONLY for time period T; |
| 6 | End if |

For connectivity, the C3 protocol establishes the communication links between neighboring clusterheads (and gateways). Clusterheads execute the steps outlined in Table 10 to connect to each other so that communication may take place.

TABLE 10

C3 Algorithm 6 - makeLinks
/* Clusterheads run the following steps to connect: */

| | |
|---|---|
| 1 | Check and establish connectivity to the neighboring clusterheads. |
| 2 | Define gateways if no direct link is available to any clusterhead in the upper hop (i.e., closer to the sink) or at peer (i.e., same hop). If any gateway to the upper hop is not available, then find at the peer hop. |
| 3 | Set clusterheads and gateways to FULLY ACTIVE modes (others are eligible to sleep or sensing only modes subject to the coverage-control steps in Algorithm 6: setModes). |

Regarding routing or communication, the C3 protocol method 10 allows nodes to send and receive data through clusterheads which may involve gateways as well. Nodes communicate in the network using the rules set forth in Table 11.

TABLE 11

C3 Algorithm 7 msgRouting

| | |
|---|---|
|   | /* Nodes communicate in the network using the following rules: */ |
| 1 | If myRingNo <= 2 then |
| 2 | Send data directly to the sink; |
| 3 | Else if node i is an ordinary node or a gateway node then |
| 4 | Send data to the clusterhead; |
| 5 | Else if node i is a clusterhead then |
| 6 | If two or more clusterheads are available in the upper ring, i.e., |
| 7 | closer to the sink then |
| 8 | Pick a clusterhead with higher residual energy; |
| 9 | Send data to the selected clusterhead; |
| 10 | Else if one clusterhead is available in the upper ring then |
| 11 | Send data to the clusterhead in upper ring; |
| 12 | Else if a gateway is available in the upper ring then |
| 13 | Send data to the gateway; |
| 14 | Else if a clusterhead or a gateway is available at peer then |
| 15 | Send data to the clusterhead or gateway at peer; |
| 16 | Else |
| 17 | Broadcast at maximum transmission power; |
| 18 | End if |

Figure 5:
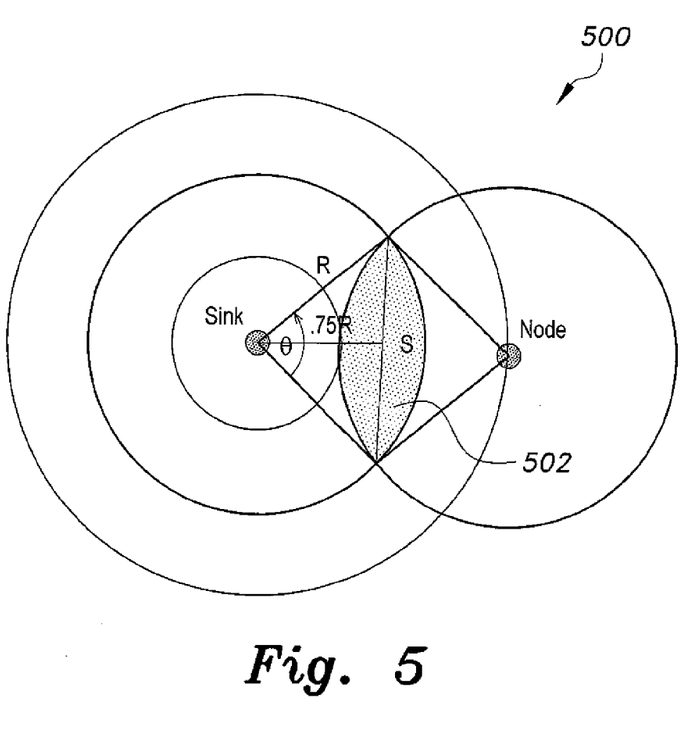
FIG. 5 is a diagram illustrating potential forwarders or CHs as determined by the coverage, connectivity and communication (C3) protocol method for wireless sensor networks according to the present invention.

As the C3 protocol uses rings for connectivity, it is important to analyze the network connectivity in terms of ring width. As nodes in the first and second ring can directly access the sink, let us consider a case where a node in the third ring wants to send data to the sink. As shown in FIG. 5, the network connectivity 500 depends on the total number of nodes present in the shaded area 502. The total number of nodes (i.e., clusterheads or gateway nodes) $K_N$ in the shaded area 502 can be calculated by finding the total area of circular segment S, multiplying it by 2, and then multiplying it by the network density ρ that is nodes/meter²:

$$K_N = 2\rho\left[\frac{R^2}{2}(\theta - \sin\theta)\right] \quad (3)$$

$$K_N = \rho R^2(\theta - \sin\theta) \quad (4)$$

The angel θ can be calculated as follows:

$$\theta = 2\cos^{-1}\left(\frac{0.75R}{R}\right) \quad (5)$$

$$\theta = 1.445 \quad (6)$$

As μ=R/2.45, therefore R=2.45μ. Putting the value of R and θ in equation (4) gives the following equation:

$$K_N = \rho(2.45\,\mu)^2(1.445 - \sin 1.445) \quad (7)$$

Solving equation (7) results in the following equation:

$$K_N = 2.721\,\rho\mu^2 \quad (8)$$

It is clear from equation (8) that the total number of potential forwarders $K_N$ in the shaded area is determined by network density ρ and width of rings μ where μ=R/2.45. For example, if R=15 m (and hence μ=6.122) and ρ=0.08, then $K_N$ will be 8. In other words, the total number of potential forwarders in the shaded area depends on the communication range $R_c$ and the network density ρ.

In the C3 protocol method 10, one or more always-on clusterheads in the shaded area will serve as potential forwarders for the neighboring nodes in an outer ring.

Figure 6:
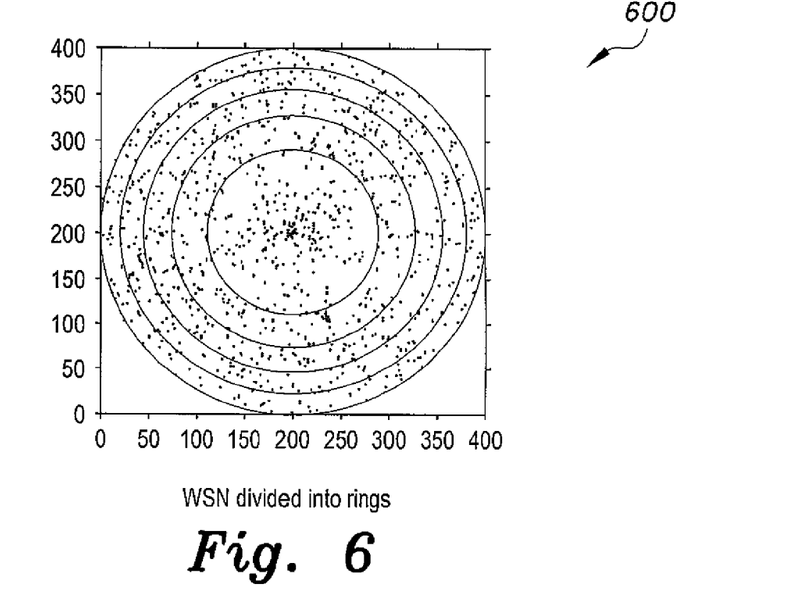
FIG. 6 is a diagram illustrating a WSN divided into rings in a coverage, connectivity and communication (C3) protocol method for wireless sensor networks according to the present invention.
Figure 7:
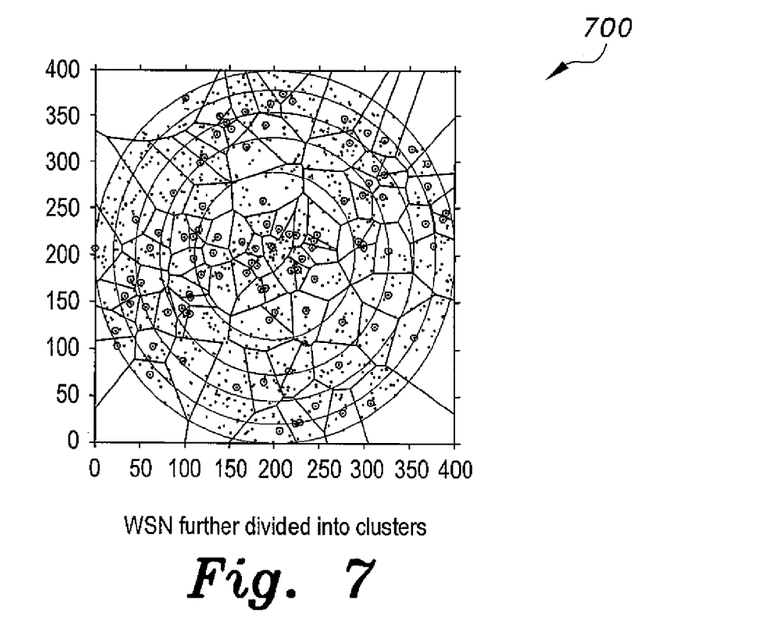
FIG. 7 is a diagram illustrating the WSN of FIG. 6 further divided into clusters according to the present invention.

After a WSN is deployed, it is divided into virtual rings of width μ and then into clusters, as shown in the FIG. 6, diagram 600, and FIG. 7, diagram 700.

Figure 9:
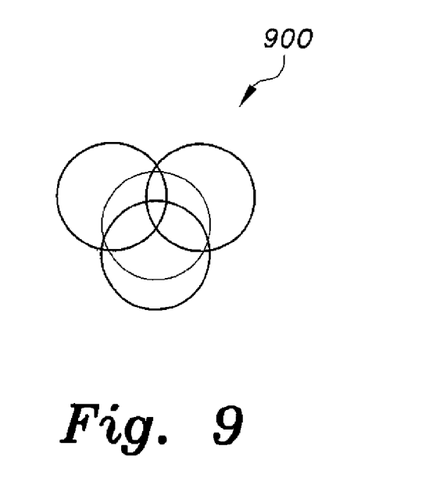
FIG. 9 is a diagram illustrating a redundant node disposed in the middle in a coverage, connectivity and communication (C3) protocol method for wireless sensor networks according to the present invention.

With respect to coverage, the C3 protocol uses triangular tessellation for establishing single coverage in the network. It allows nodes on the triangle corners to be actively sensing, while putting the redundant nodes to sleep mode. FIG. 8, diagram 800, shows the process of triangular tessellation, while FIG. 9, diagram 900, shows a sensing redundant node in the middle.

Figure 10:
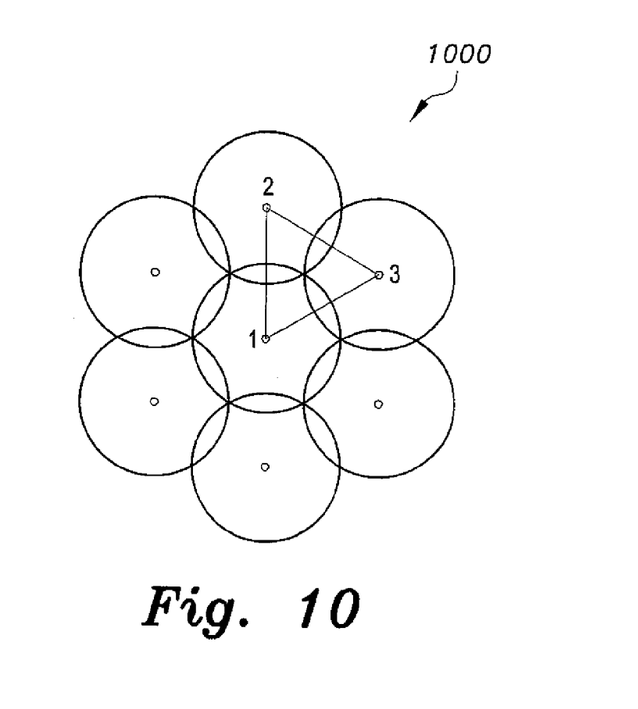
FIG. 10 is a diagram illustrating triangular tessellation for optimal coverage within a cluster in a coverage, connectivity and communication (C3) protocol method for wireless sensor networks according to the present invention.

The process of triangular tessellation takes place within the cluster. The cluster head in the central ding (i.e., a ring inside the cluster) starts the process, while nodes in the neighboring ding respond as shown in FIG. 10, diagram 1000.

The width of each side of the triangle is approximately $\sqrt{3}R_s$. However, the achieved coverage is dependent on the availability of nodes at required positions and the accuracy of distance estimation based on RSSI.

Regarding end-to-end delay, the C3 protocol method uses virtual rings, like MS-MAC. This analogy can help us analyzing the end-to-end delay in the network. According to a formulation known by those of ordinary skill in the art, the end-to-end delay d can be given as follows:

$$d = 2.45 N \Delta + T_{sleep}/k \quad (9)$$

where N is the number of hops, $\Delta$ is the packet transmission delay, and $T_{sleep}/k$ is the staggered wakeup time for k nodes. However, as C3 protocol keeps at least one clusterhead or a gateway always in active mode, $T_{sleep}=0$. This results in equation (10) as follows:

$$d = 2.45 N \Delta \quad (10)$$

As the C3 protocol mostly makes clusterheads in the alternating rings and communication is done through clusterheads (may involve gateways if no direct link available), the number of hops N is halved. This gives us equation (11) as follows:

$$d = 2.45 N \Delta \quad (11)$$

It is clear from equation (11) that the end-to-end delay in C3 is slightly greater than the delay in the fully active network, which is $d=N\Delta$. This is because the C3 protocol method results in a route-length that is slightly longer than the shortest path.

A multi-hop network of sensor nodes is deployed in the field. The nodes consist of Crossbow Telosb motes, which use the IEEE 802.15.4/ZigBee compliant RF transceiver, have an outdoor range of 75 m to 100 m, provide a data rate of about 250 kbps, have 8 MHz Texas Instruments MSP430 microcontroller with 10 kB RAM and 1 MB external flash, use CC2420 radio chip, have a 32 kHz crystal timer, run on TinyOS, and incorporate light, temperature and humidity sensors—TPR2420.

A total of thirteen sensor nodes, including the sink, are pseudo-randomly deployed in an open area. Each sensor node is put in the middle of a 3D-weaving of 3 sticks to keep the node about ⅓ m above the surface.

The experimental prototype uses a Java application interface named as TinyCatcher (Sheltami et al. 2009), which is used to read messages in the network. TinyCatcher actually depends on SerialForwarder that comes with TinyOS and works as a proxy for reading and writing packets from and to the network. Therefore, instead of reading data directly from the serial port, TinyCatcher connects to SerialForwarder.

TinyCatcher needs to set two parameters, which include 'Address' of the PC running SerialForwarder, and 'Port' used by SerialForwarder. After this, one can connect and listen to the messages, or close the connection when finished. Some of the useful functions of TinyCatcher include: 'Get Node Stat' for displaying the data sensed by a particular node, 'Configure Power' for setting the transmission power level of a particular node, 'Add/Remove Node' for adding or removing any node, 'Send Echo' for pinging a node, and 'Discovery' for finding a new or failed node.

SerialForwarder needs to set two parameters, including 'Server Port' to be opened for server thread, and 'Mote Communication' to specify port number and baud rate as serial@ (serial port):(baud rate). It also displays information on number of packets read, number of packets sent and number of clients connected.

Using the functions provided by TinyCatcher based on SerialForwarder, several experiments were conducted, and very useful results were obtained.

The C3 protocol method 10 uses RSSI for distance estimation. To test its efficacy RSSI values were measured at different distances and power levels.

An experiment was conducted to realize the effective area covered by a sensor node. RSSI values were measured in different directions at a distance of 3 meters from the transceiver and plotted. It can be concluded that the coverage area of a node may not be a perfect circle because RSSI values in different directions of the sender may differ due to the environmental differences, transceiver orientation, etc.

Two experiments were conducted to study the connectivity and communication in the network. The main indicators were the delay and throughput of the network. Throughput decreases slightly with the increase in number of hops, but decreases significantly when the number of packets transmitted cross the threshold of 76 packets.

The second experiment was conducted to study the average delay (end-to-end delay) in the network. The average delay increases with the increase in number of nodes transmitting at the same time.

The C3 protocol method is implemented and run by each node in the network. For simplicity, it is assumed that communication range ($R_C$) is equal to the sensing range ($R_S$). The sink node is attached to a notebook and is also used as the reference node for clock synchronization using the RTSP algorithm. Four rings are made by the C3 algorithm. The current scenario shows an odd-numbered round where nodes in the odd-numbered rings have more probability to become clusterheads. However, a node in an even-numbered ring may also become clusterhead if there is no node present in its vicinity on the odd-numbered ring.

In the network infrastructure 100 (shown in FIG. 1) created by the C3 protocol method 10, nodes with circled ID are elected as cluster heads. Nodes E and F are ordinary nodes, which are in a cluster whose clusterhead is node D, while node H is an ordinary node, which is in a cluster whose clusterhead is node G. Similarly, nodes J and K are ordinary nodes, which are in a cluster whose clusterhead is node I. There are two redundant nodes in the network, i.e., node F in cluster D and node J in cluster I. These redundant nodes are put to sleep mode in the current scenario. These results validate the infrastructure creation and maintenance capabilities of C3 protocol.

In order to evaluate the performance of the C3 protocol method 10, a simulation is done in MATLAB using the parameters shown in Table 12. The simulation was run to collect data on average coverage ratio, packet delivery ratio, number of fully active nodes, lifetime of the system, and energy consumption in the long run. As known by those having ordinary skill in the art, the radio energy dissipation model can be used for estimating the energy consumed in transmission ($E_{Tx}$) and reception ($E_{Rx}$). The energy consumed in transmission ($E_{Tx}$) of k bits is given by the following equation:

$$E_{Tx}(k, d) = k E_{elec} + k E_{amp} d^\alpha \quad (12)$$

where k is the packet length in bits, d is the distance between transmitter and receiver, $E_{elec}$ is the electronics energy which depends on many factors including signal's digital coding, modulation, filtering, and spreading, $E_{amp} \in \{E_{fs}, E_{mp}\}$ is the amplifier energy used in free space and multipath, respectively, depending on the distance and the tolerable bit-error rate, and $\alpha$ is the path-loss exponent that is $2 \le \alpha \le 4$. The simplified or explanatory form of the equation (10) is given as follows, where threshold distance $d_0 = \sqrt{E_{fs}/E_{mp}}$:

$$E_{Tx}(k,d) = \begin{cases} kE_{elec} + kE_{fs}d^2, & d < d_0 \\ kE_{elec} + kE_{mp}d^4, & d \geq d_0 \end{cases} \quad (13)$$

Similarly, the energy consumed in reception ($E_{Rx}$) of k bits is given as follows:

$$E_{Rx}(k) = kE_{elec} \quad (14)$$

In other words, $E_{Tx}$ is the sum of electronics energy and amplifier energy, while $E_{Rx}$ is only the amplifier energy. Hence total energy consumed in receiving and forwarding a message is equal to the sum of $E_{Tx}$ and $E_{Rx}$. It is important to mention that the energy consumed in environmental sensing is not considered because it is usually negligible, constant and always same for any protocol.

TABLE 12

Simulation Parameters for C3

| Parameter | Description |
| --- | --- |
| No. of nodes | 50, 100, 200, 500 |
| Prob. of becoming clusterhead | 5% |
| Topology | Random |
| Deployment area | 50 m × 50 m to 500 m × 500 m |
| Clock synchronization | RTSP (Akhlaq and Sheltami 2012) |
| Mobility model | Random Walk with High Mobility (pause time 0) |
| No of simulations (results averaged) | 1000 |
| Channel | Wireless |
| MAC | IEEE 802.15.4/ZigBee |
| Antenna | Omni |
| Transmission range and Sensing range | 10-20 m |
| $E_0$ (Initial energy of the node) | 2 J |
| $E_{elec}$ (Electronics energy) | 50 nJ/bit |
| $E_{fs}$ (Free-Space amplifier energy) | 10 pJ/bit/m$^2$ |
| $E_{mp}$ (Multi-Path amplifier energy) | 0.0013 pJ/bit/m$^4$ |
| $E_{DA}$ (Data-Aggregation energy) | 5 nJ/bit/signal |

The present protocol for Coverage, Connectivity and Communication (C3) in WSNs 10 ensures partial coverage, 1-connectivity and energy efficient communication. The C3 protocol runs in six steps: make rings using RSSI based distance estimation, define clusters such that the nodes at alternating rings have higher probability of being selected as clusterheads, make dings by setting communication range $R_C$ to $\sqrt{3}R_S$, find redundant nodes using triangular tessellation, establish connectivity between neighboring nodes and gateways, and allow data communication through clusterheads which may involve gateways. These techniques result in near-optimal deployment, load balancing, and energy-efficient communication.

The present protocol has better performance when compared to other protocols, such as CCP and LDCC. The C3 protocol gives at least 1-connected network, depending on the network density and communication range of the nodes. It provides greater than 90% coverage, which depends on the availability of nodes at the required positions and the accuracy of distance estimation based on RSSI. However, it has an end-to-end delay of 1.225N, which is only slightly greater than the delay in a fully active network because of the route-length that is slightly longer than the shortest path. The present protocol method also contemplates K-coverage and K-connectivity in WSNs, and a coarse-grain localization scheme.

It is to be understood that the present invention is not limited to the embodiments described above, but encompasses any and all embodiments within the scope of the following claims.

We claim:

1. A computer-implemented coverage, connectivity and communication (C3) protocol method for a wireless sensor network (WSN), comprising the steps of:
   establishing a plurality of nodes, including a sink node;
   measuring received signal strength indication (RSSI) of the nodes relative to the sink node and relative to each other;
   designating ring membership status to the nodes based on predetermined RSSI thresholds determined from the measuring step, the ring membership status designating step assigning each node to one of a plurality of rings extending from a first node ring to an Nth node ring based on the relative RSSI measurements;
   determining required distances between said rings using said predetermined RSSI thresholds;
   determining an optimal width u of said rings by using a communication range $R_c$ of said nodes and by computing said optimal width u as being 40% of the communication range $R_c$;
   setting said communication range $R_c = \sqrt{3}R_S$ where $R_S$ is a sensing range of said sensors;
   forming a ring inside of said cluster based on said communication range $R_c$;
   increasing the probability of a node to be selected as a clusterhead in odd-number rings during a given round of network formation and alternatively increasing the probability of said node to be selected as a clusterhead in even-numbered rings during a subsequent round of network formation, wherein neighboring nodes in a lower numbered ring join a cluster associated with said clusterhead; and
   establishing wireless communication links between neighboring nodes and gateways of the WSN.

2. The computer-implemented C3 protocol method for wireless sensor networks according to claim 1, further comprising the steps of:
   using triangular tessellation inside said cluster to identify a redundant node; and
   scheduling said redundant node to sleep for a predetermined time period T.

3. The computer-implemented C3 protocol method for wireless sensor networks according to claim 2, further comprising the step of establishing communication links between neighboring clusterheads.

4. The computer-implemented C3 protocol method for wireless sensor networks according to claim 3, further comprising the step of connecting said network based on a total number of said nodes present in an area defined by circumferential intersection of a sensing range of a target node and a communication range of said sink to all said nodes belonging to an inner adjacent ring to the ring of said target node, wherein a total number of potential forwarders $K_N = 2.721 p u^2$ where p is a density of said network.

5. A computer software product, comprising a non-transitory medium readable by a processor, the non-transitory medium having stored thereon a set of instructions for performing a coverage, connectivity and communication (C3) protocol method for a wireless sensor network (WSN), the set of instructions including:
   (a) a first sequence of instructions which, when executed by the processor, causes said processor to establish a plurality of nodes including a sink node;
   (b) a second sequence of instructions which, when executed by the processor, causes said processor to measure received signal strength indication (RSSI) of said nodes relative to said sink node and relative to each other;

(c) a third sequence of instructions which, when executed by the processor, causes said processor to designate ring membership status to said nodes based on predetermined RSSI thresholds determined from said measuring step, wherein said ring membership status designating step assigns each node to one of a plurality of rings extending from a 1st node ring to an Nth node ring based on said relative RSSI measurements; and (d) a fourth sequence of instructions which, when executed by the processor, causes said processor to determine required distances between said rings using said predetermined RSSI thresholds;

(e) a fifth sequence of instructions which, when executed by the processor, causes said processor to determine an optimal width u of said rings by using a communication range $R_c$ of said nodes and by computing said optimal width u as being 40% of the communication range $R_c$;

(f) a sixth sequence of instructions which, when executed by the processor, causes said processor to set said communication range $R_c = \sqrt{3} R_S$ where $R_S$ is a sensing range of said sensors;

(g) a seventh sequence of instructions which, when executed by the processor, causes said processor to form a ring inside of said cluster based on said communication range $R_c$;

(h) an eighth sequence of instructions which, when executed by the processor, causes said processor to increase the probability of a node to be selected as a clusterhead in odd-number rings during a given round of network formation and alternatively increase the probability of said node to be selected as a clusterhead in even-numbered rings during a subsequent round of network formation, wherein neighboring nodes in a lower numbered ring join a cluster associated with said clusterhead;

(i) a ninth sequence of instructions which, when executed by the processor, causes said processor to establish wireless communication links between neighboring said nodes and gateways of said WSN.

6. The computer software product according to claim 5, further comprising:

a tenth sequence of instructions which, when executed by the processor, causes said processor to use triangular tessellation inside said cluster to identify a redundant node; and an eleventh sequence of instructions which, when executed by the processor, causes said processor to schedule said redundant node to sleep for a predetermined time period T.

7. The computer software product according to claim 6, further comprising a twelfth sequence of instructions which, when executed by the processor, causes said processor to establish communication links between neighboring clusterheads.

8. The computer software product according to claim 7, further comprising a thirteenth sequence of instructions which, when executed by the processor, causes said processor to connect said network based on a total number of said nodes present in an area defined by circumferential intersection of a sensing range of a target node and a communication range of said sink to all said nodes belonging to an inner adjacent ring to the ring of said target node, wherein a total number of potential forwarding nodes $K_N = 2.721 p u^2$ where p is a density of said network.

* * * * *